United States Patent [19]

Hillen

[11] Patent Number: 4,637,497
[45] Date of Patent: Jan. 20, 1987

[54] SELF-ENERGIZING DISC BRAKES

[75] Inventor: Klaus Hillen, Neuwied, Fed. Rep. of Germany

[73] Assignee: Lucas Industries, Birmingham, England

[21] Appl. No.: 828,785

[22] Filed: Feb. 12, 1986

[30] Foreign Application Priority Data

Feb. 13, 1985 [GB] United Kingdom ............... 8503668

[51] Int. Cl.⁴ .................... F16D 65/46; F16D 65/48; F16D 65/50
[52] U.S. Cl. .................................. 188/71.4; 188/71.5; 188/71.7; 188/72.5; 188/72.7; 188/196 M; 188/196 V
[58] Field of Search ................ 188/71.4, 71.5, 71.7, 188/72.2, 72.7, 196 M, 196 V, 72.5; 192/111 R

[56] References Cited

FOREIGN PATENT DOCUMENTS 2638145 3/1978 Fed. Rep. of Germany ..... 188/71.4
1030312 5/1966 United Kingdom .
1288027 9/1972 United Kingdom ............. 188/71.4

Primary Examiner—George E. A. Halvosa
Assistant Examiner—Richard R. Diefendorf
Attorney, Agent, or Firm—Sand & Hudak Co.

[57] ABSTRACT

A self-energizing disc brake of the spreading type incorporates a drag-taking stop abutment for arresting angular movement of one of the pressure plates when the brake is applied. The stop abutment comprises a cam which is mounted on the inner end of a cam shaft, and the cam shaft is rotatable in a radial bore in the housing to adjust the relative circumferential position of the stop abutment.

7 Claims, 5 Drawing Figures

SELF-ENERGIZING DISC BRAKES

This invention relates to self-energising disc brakes of the kind in which rotatable friction discs provided with linings of friction material are adapted to be brought into engagement with spaced opposed braking surfaces in a housing by pressure plates located between the friction discs and centred by stationary pilot lugs, balls or rollers are located in co-operating oppositely inclined recesses in the adjacent faces of the pressure plates, and the application of the brake is initiated by moving the pressure plates angularly in opposite directions, the pressure plates then moving apart, due to the tendency for the balls or rollers to ride up ramps defined by the edges of the recesses, and into engagement with the friction discs which are urged into engagement with the braking surfaces, and the pressure plates are carried round with the friction discs until one is arrested by the engagement of a lug on the plate with a drag-taking stop abutment in the housing, the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

G.B. Pat. No. 1 030 312 discloses a brake of the kind set forth in which the position of the stop abutment for arresting the angular movement of at least one of the plates for a normal direction of forward rotation of the discs is adjustable to compensate for wear of the friction linings, in turn to reduce the angular movement of the plate before angular movement of that plate is arrested, which reduces the impact of the plate with the abutment. In the construction of G.B. Pat. No. 1 030 312 a separate stop abutment for each direction of disc rotation is provided, and the stop abutment comprises a pair of the angularly spaced pilot lugs which centre the plates, a pair of bolts inclined in opposite directions being screwed through the pilot lugs so that the inner end of each bolt projects through its pilot lug for engagement by a lug on a respective plate to arrest that plate when the brake is applied.

Apart from having to provide separate pilot lugs, the brake of G.B. 1 030 312 suffers from the disadvantage that there is a tendency for the bolts to seize or otherwise corrode in the pilot lugs.

According to our invention in a brake of the kind set forth the drag-taking stop abutment comprises a cam which is mounted on the inner end of a cam shaft, and the shaft is rotatable in a radial bore in the housing to adjust the relative circumferential position of the stop abutment.

Preferably two such angularly spaced drag-taking stop abutments are provided, one for each pressure plate.

When an actuator for initiating relative angular movement of the plates to apply the brake comprises an hydraulic piston and cylinder assembly acting between a pair of lugs on the plates, the two cams are spaced angularly from each other and are disposed adjacent to opposite ends of the assembly, each lug being provided with an abutment face which is adapted to co-operate with the respective cam to arrest rotation of the respective plate when the brake is applied, according to the direction of disc rotation.

The outer ends of both cam shafts are accessible externally of the housing for adjustment by the use of a suitable spanner, after first releasing a respective lock nut screwed onto a threaded portion of the cam shaft and normally clamped against a face on the housing to lock the cam shaft against rotation.

Our adjustable drag-taking stop abutments can be simply incorporated in any new or existing brake with a minimum of additional work. The only modification necessary to the housing is the provision of angularly spaced radial bores in which the two cam shafts are rotatable, and no screw-threaded engagements between the bolts and the housing are required.

One embodiment of our invention and a modification is illustrated in the accompanying drawings in which:

FIG. 4 is a view on arrow "4" of FIG. 1; and

FIG. 5 is an end view of a stop abutment.

Figure 1:
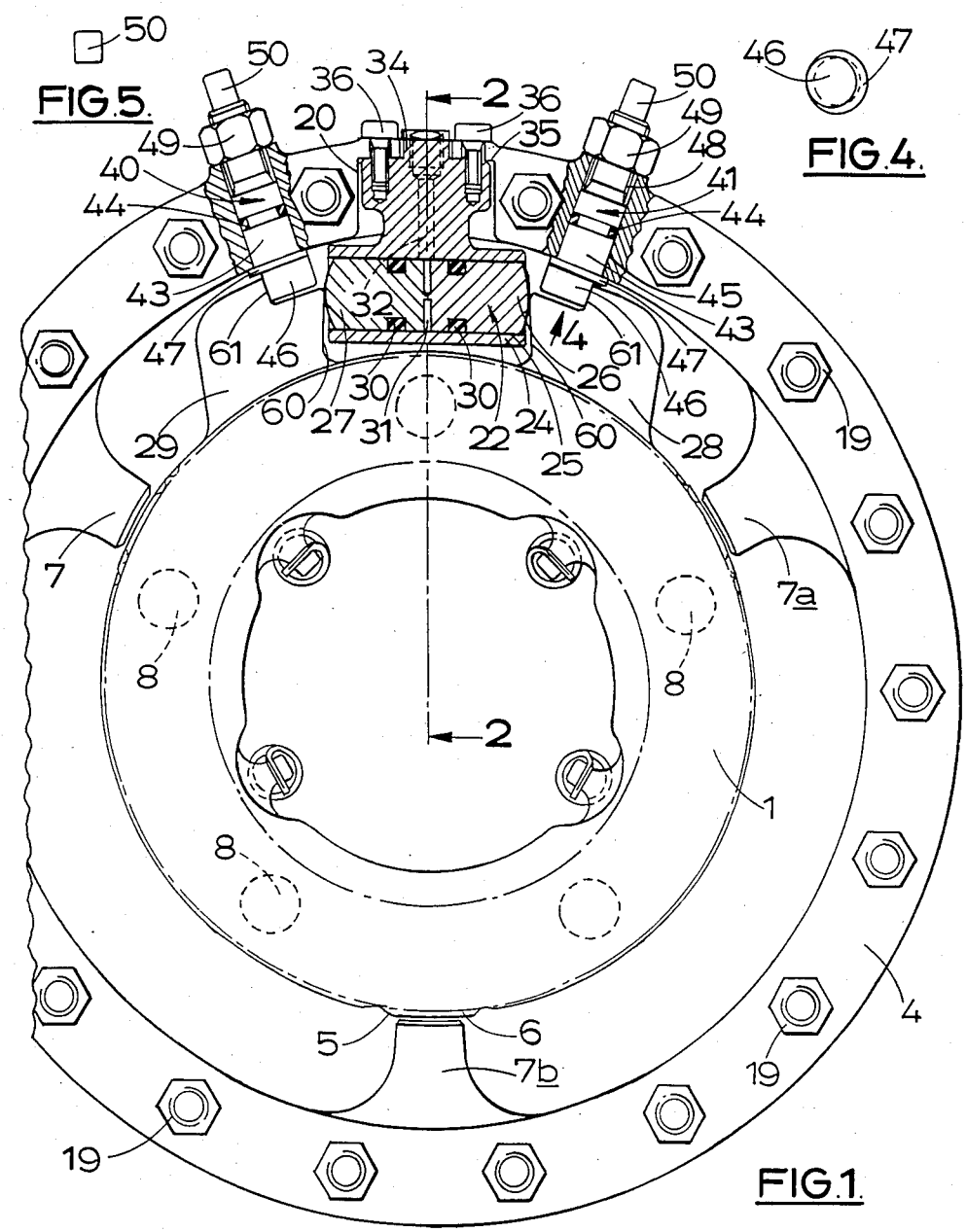
FIG. 1 is an end view of a portion of a spreading brake.
Figure 2:
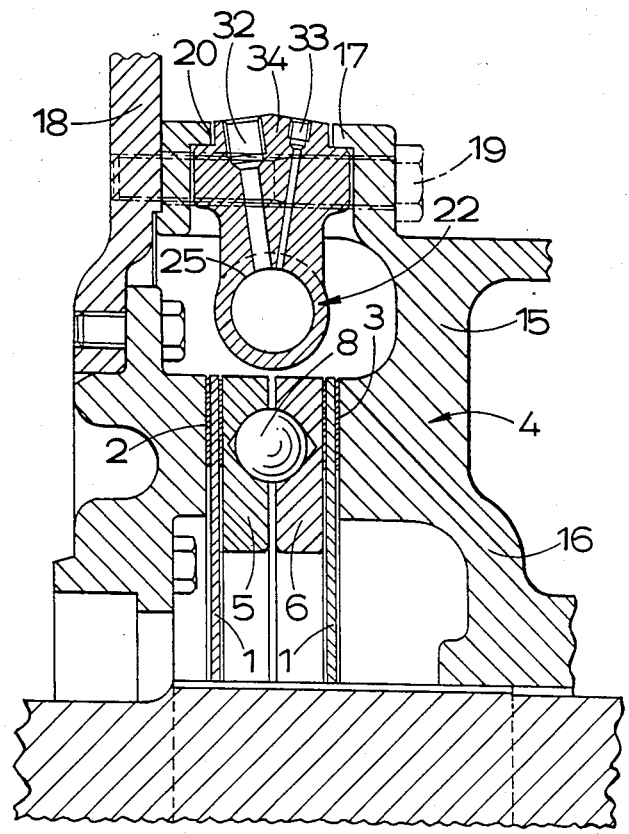
FIG. 2 is a section on the line 2—2 of FIG. 1.

The brake illustrated in FIGS. 1, 2, 4 and 5 of the drawings is of a conventional spreading type in which two rotatable friction discs 1 provided on opposite sides with friction linings are adapted to be brought into engagement with spaced opposed braking surfaces 2, 3 in a housing 4 by pressure plates 5, 6 located between the discs 1 and centred by three angularly spaced stationary pilots 7, 7a, 7b. Balls 8 are located in co-operating oppositely inclined recesses in the adjacent faces of the pressure plates 5, 6.

The application of the brake is initiated by moving the pressure plates 5, 6 angularly in opposite directions which causes the pressure plates 5, 6 to move axially relatively away from each other due to the tendency for the balls 8 to ride up ramps defined by the end faces of of the recesses. This urges the friction discs into engagement with the faces 2 and 3 in the housing 4. The pressure plates 5, 6 are then carried round with the discs 1 until one is arrested by the engagement of a lug on a respective plate with a drag-taking abutment, as will hereinafter be described, whereafter continued angular movement of the other plate provides a servo action.

The housing 4 comprises a first member 15 in the form of a casting comprising an end wall 16 of which the inner face constitutes the braking surface 3, and an integral, axially extending, annular flange constituting a radial wall 17. The open face at the free end of the flange 17 is closed by an end plate 18 bolted to the casting 15 by angularly spaced bolts 19. A radial opening 20 of stepped outline is provided in the flange 17, and the opening provides a mounting for an hydraulic actuator 22 by means of which the brake is applied for normal service braking.

As illustrated the hydraulic actuator 22 comprises a cylinder 24 having an open-ended longitudinal throughbore 25 in which work a pair of oppositely acting pistons 26, 27 for engagement between lugs 28 and 29 on the plates 5, 6. Each piston 26, 27 carries a seal 30 adjacent to its inner end. A pressure space 31 defined in a bore 25 between adjacent inner ends of the pistons 26 and 27 is connected to a master cylinder through a passage 32, and a bleed passage 33 also leads from the pressure space 31.

The cylinder 24 is integral with the inner end of a spigot 34 of which the outer end is clamped against a face 35 at a shoulder at a step in diameter by means of circumferentially spaced bolts 36.

Figure 3:
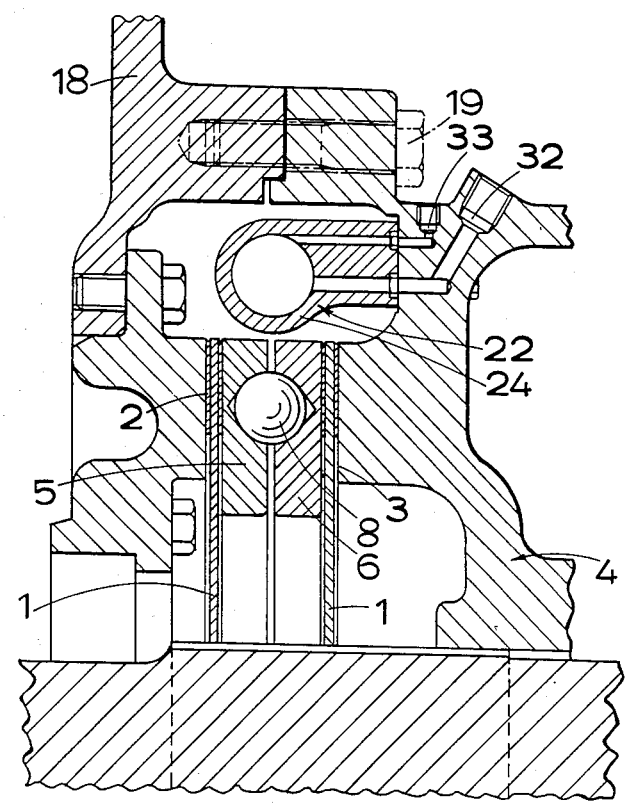
FIG. 3 is a section similar to FIG. 2 but showing a modification.

In the modified construction illustrated in FIG. 3, the radial opening 20 is omitted, and the cylinder 24 is mounted on the end wall 16.

The brake is provided with a pair of angularly spaced stop abutments 40, 41 which are disposed adjacent to opposite ends of the cylinder 24.

Each stop abutment 40, 41 comprises a cam shaft 43 carrying a seal 44 and rotatably mounted in a radial bore 45 in the flange 17 of the housing 4. The inner end of the cam shaft 43 carries an eccentrically mounted circular cam 46 at the outer end of a radial flange 47 co-axial with, and of a diameter greater than, the cam shaft 43. An outer end portion 48 of the cam shaft 43 threaded to receive a lock nut 49 terminates in a portion 50 of square cross-section as shown in FIG. 5.

Each lug 28, 29 is of stepped outline having a forward thrust-receiving face 60 with which the respective piston 26, 27 is engageable, and a rearwardly, generally radial, drag transmitting abutment face 61 for engagement with the respective cam 46.

When the brake is applied by pressurisation of the pressure space 31, the pistons 26, 27 move away from each and act on the faces 60 to cause the pressure plates 5, 6 to move relatively axially and angularly as described above.

Assuming that the discs 1 are rotating in a clockwise direction, then the plates 5, 6 will be carried round in that same direction until the angular movement of the plate 5 is arrested by the engagement of the lug 29 by the stop abutment 40, specifically by the engagement of the face 61 with the cam 46. The other pressure plate 6 continues to be carried round with the disc 1 to provide the servo or self-energising action as described above.

Normally, when the linings on the discs 1 are new, the cams 46 are assembled in the position shown in the drawings with the maximum throws facing away from the lugs 28 and 29. When the linings wear and the angular distance through which the plate which is arrested when the brake is applied, become excessive, the cam shafts 43 are rotated to take up these distances and hold the balls 8 up the ramps of the recesses, by predetermined distances.

This is achieved by slackening the lock nuts 49 and then, by the use of a suitable spanner, rotating each cam shaft 43 in its bore. The lock nut 49 is then tightened to lock the cam shaft 43 and the cam 46 in the adjusted position against rotation with respect to the housing, with the flange 47 clamped against the interior of the flange 17 on the housing 5.

I claim:

1. A self-energising disc brake comprising a housing, first and second axially spaced braking surfaces in said housing, radial pilot lugs and a drag-taking stop abutment in said housing, first and second pressure plates centred on said pilot lugs, adjacent faces of said pressure plates being provided with co-operating oppositely inclined angularly spaced recesses, rolling bodies located in complementary pairs of said recesses, a rotatable friction member disposed between each said pressure plate and an adjacent one of said braking surfaces, each said member comprising a disc, and first and second linings of friction material for engagement with each said pressure plate and said braking surface carried by opposite faces of said discs, and means for moving said pressure plates angularly relative to said housing to initiate application of said brake with said pressure plates also moving axially to urge the friction members into engagement with said braking surfaces due to a tendency for said rolling bodies to ride up ramps defined by said adjacent faces and constituting camming means, said plates being carried round with said discs until one of said plates is arrested by the engagement of a lug on that plate with said drag-taking stop abutment, whereafter continued angular movement of the other of said plates provides a servo action, wherein said drag-taking stop abutment comprises a cam shaft rotatable in a radial bore in said housing, and a cam which is mounted on the inner end of said cam shaft to adjust the relative circumferential position of said stop abutment in response to rotation of said cam shaft.

2. A brake as claimed in claim 1, wherein said cam is circular in section and is eccentrically mounted on said cam shaft.

3. A brake as claimed in claim 1, wherein a separate drag-taking stop abutment is provided for each direction of disc rotation, each said abutment comprising a cam mounted on the inner end of a respective said cam shaft.

4. A brake as claimed in claim 3, wherein said stop abutments are spaced angularly from each other and are disposed at opposite ends of an actuator for applying said brake.

5. A brake as claimed in claim 4, wherein said actuator comprises an hydraulic piston and cylinder assembly acting between a pair of lugs on said plates, each said lug being provided with an abutment face which is adapted to co-operate with the respective said cam to arrest rotation of a respective one of said plates when said brake is applied, according to the direction of disc rotation.

6. A brake as claimed in claim 5, wherein said actuator comprises a cylinder having a through-bore in which work a pair of pistons, and each said lug is also provided with a thrust-receiving face which is spaced from said abutment face and is adapted to receive a brake-applying force from a respective one of said pistons.

7. A brake as claimed in claim 1, wherein the outer end of the said cam shaft is accessible externally of said housing for adjustment by the use of a suitable spanner, after first releasing a lock nut screwed onto a threaded portion of said cam shaft against the housing to lock said cam shaft against rotation.

* * * * *